Figure 1:
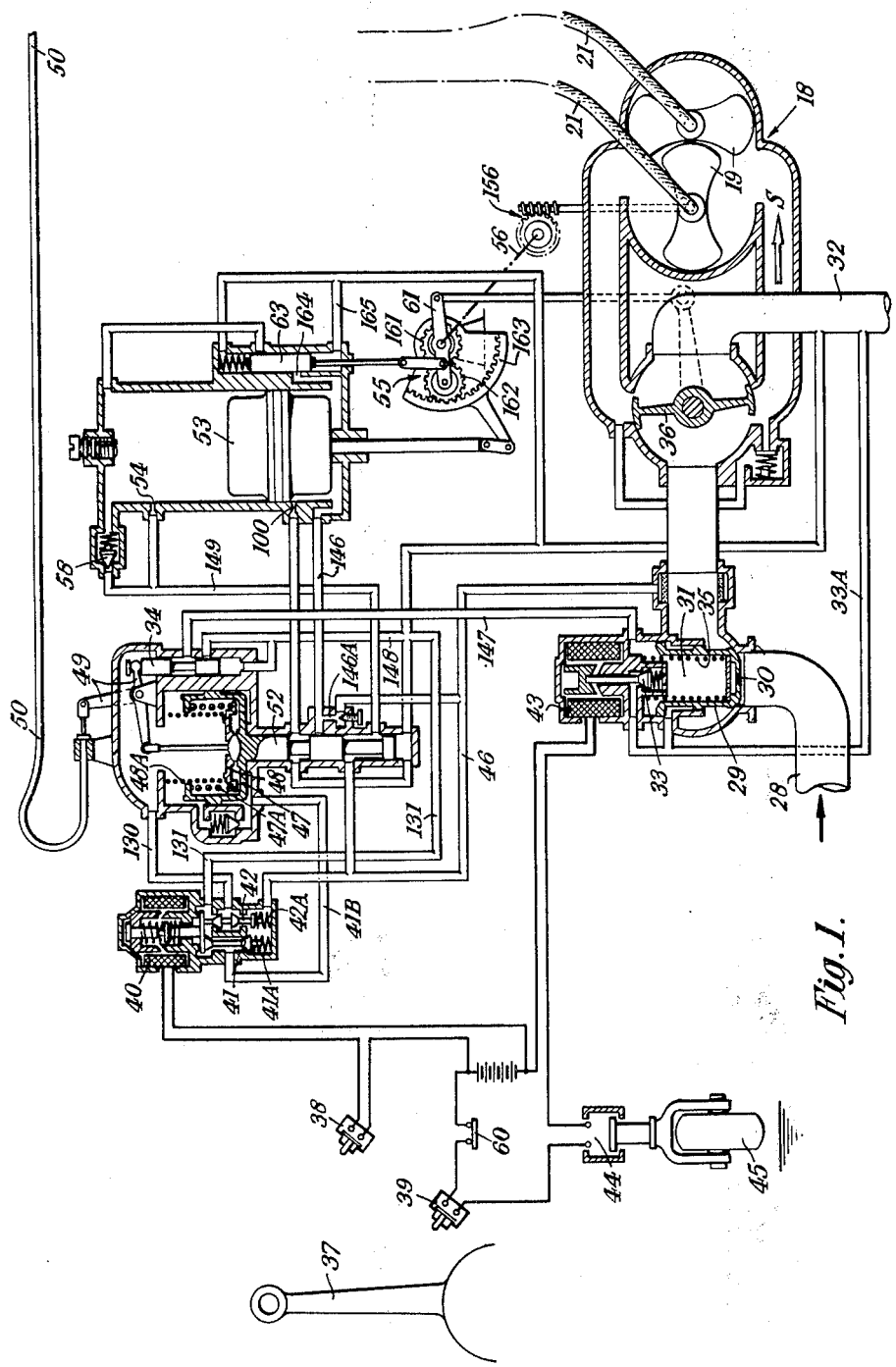

United States Patent [19]
Capewell et al.

[11] 3,931,944
[45] Jan. 13, 1976

[54] THRUST REVERSAL SYSTEM FOR JET AIRCRAFT ENGINES

[75] Inventors: Terence John Capewell, Brewood; Arthur Leslie Lloyd; David Marshall, both of Wolverhampton, all of England

[73] Assignee: Lucas Aerospace Limited, Wolverhampton, England

[22] Filed: Mar. 21, 1974

[21] Appl. No.: 453,411

[30] Foreign Application Priority Data
Mar. 21, 1973  United Kingdom............... 13697/73

[52] U.S. Cl............. 244/110 B; 60/230; 239/265.37
[51] Int. Cl.²......................................... B64D 33/04
[58] Field of Search...... 244/110 B, 53 R, 52, 12 D, 244/23 D; 239/265.19, 265.25, 265.29, 265.31, 265.33, 265.37; 60/226 A, 229, 230

[56] References Cited
UNITED STATES PATENTS

| | | | |
|---|---|---|---|
| 2,619,794 | 12/1952 | Lombard | 239/265.37 |
| 2,780,057 | 2/1957 | Stavert | 239/265.19 |
| 3,086,360 | 4/1963 | Gavin | 60/229 |
| 3,655,134 | 4/1972 | Greenland et al. | 239/265.37 |
| 3,719,324 | 3/1973 | Uehling et al. | 239/265.19 |

Primary Examiner—Trygve M. Blix
Assistant Examiner—Barry L. Kelmachter

[57] ABSTRACT

A thrust reversal system for a jet aircraft engine, comprising thrust reverser buckets movable between a stowed and a deployed position, an air motor operable under pilot's control to impart movement to the buckets, a piston movable in a cylinder having restricted outlet orifices for automatically decelerating the motor when the buckets approach both the stowed and the deployed position, a locking mechanism for locking the buckets in the stowed position and a flow control valve for controlling the direction of flow of operating air to the motor, the flow control valve, upon selection of deploy, initially occupying a position corresponding to movement of the motor in the direction to stow the buckets and, after release of the locking mechanism, moving to its alternative position to enable the motor to move the buckets to the deployed position.

7 Claims, 11 Drawing Figures

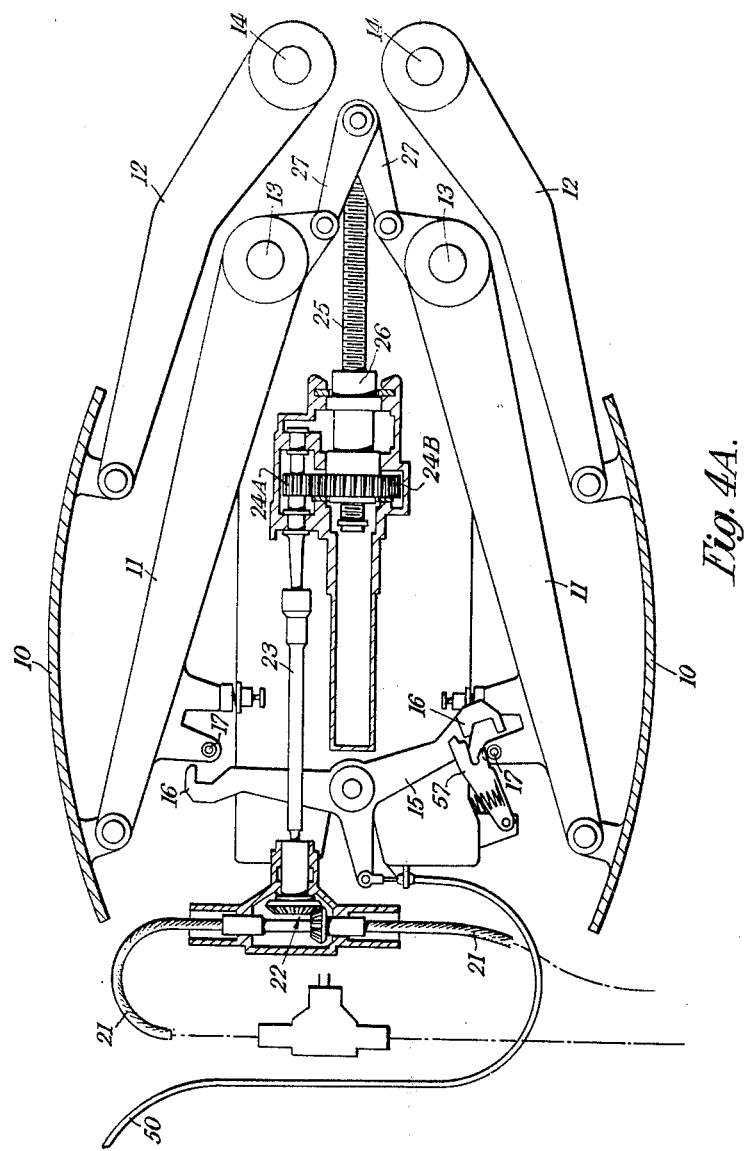

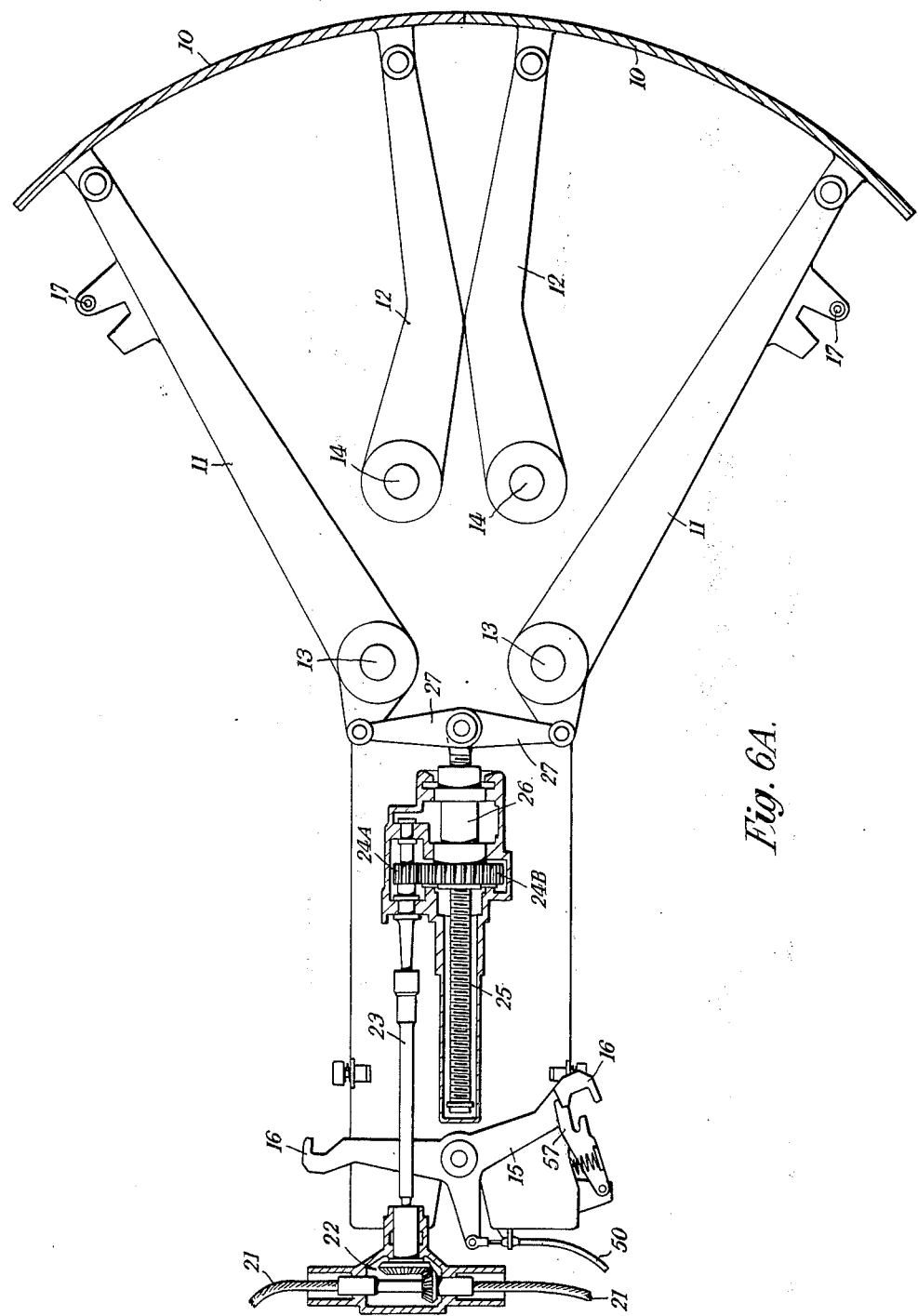

THRUST REVERSAL SYSTEM FOR JET AIRCRAFT ENGINES

This invention provides a thrust reversal system for jet aircraft engines of the type described in U.S. Pat. No. 3,655,134 and comprising thrust reverser buckets movable between a stowed and a deployed position, an air motor operable under pilot's control to impart movement to the buckets, a flow control valve for controlling the direction of flow of operating air to the motor, means for automatically decelerating the motor when the buckets approach both the stowed and the deployed position and a locking mechanism for locking the buckets in the stowed position.

With a view to facilitating the release of the locking mechanism upon selection of the deploy by the pilot, the invention provides a thrust reversal system of this type in which, upon selection of deploy, the flow control valve initially occupies a position corresponding to movement of the motor in the direction to stow the buckets and, after release of the locking mechanism, moves to its alternative position to enable the motor to move the buckets to the deployed position.

Figure 1A:
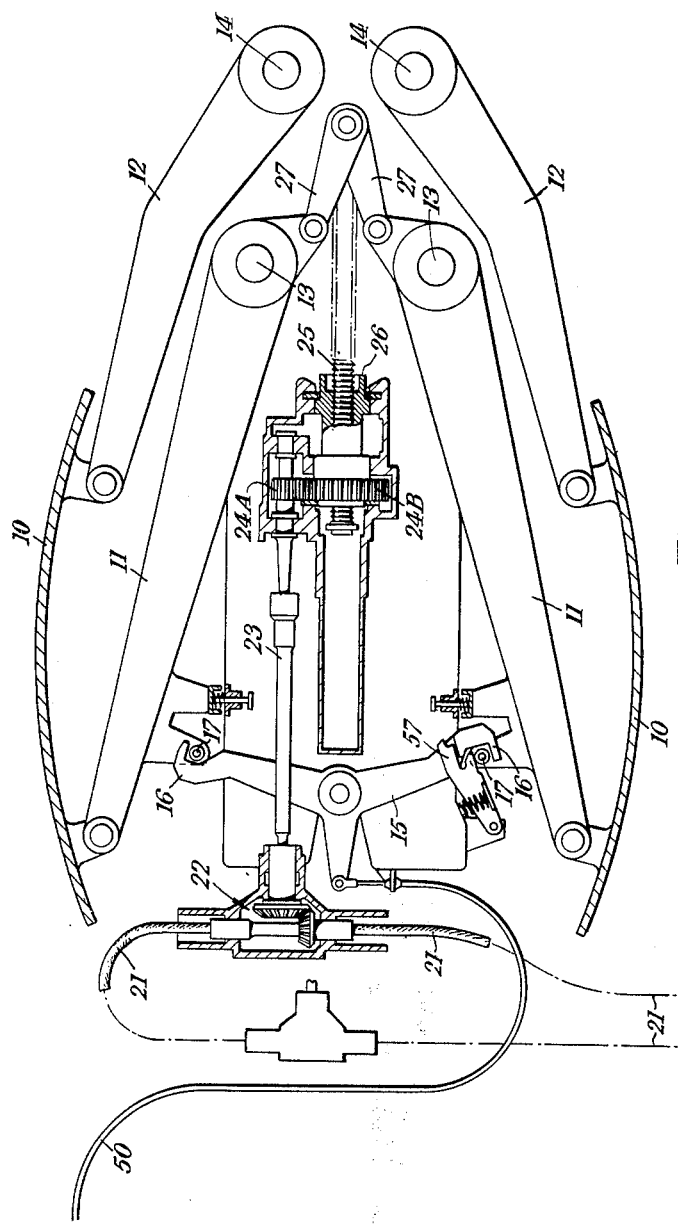
Figure 2:
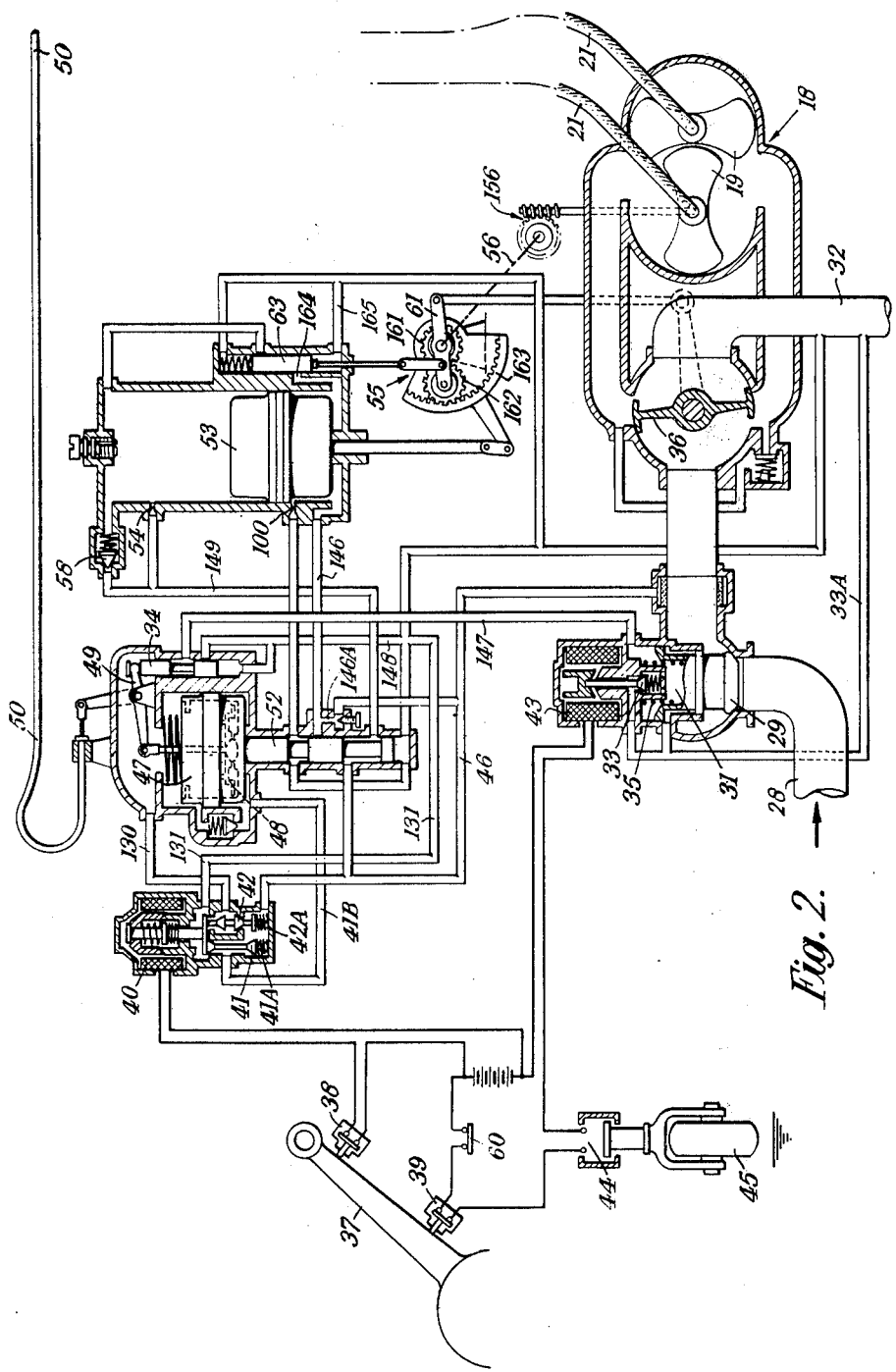
Figure 3:
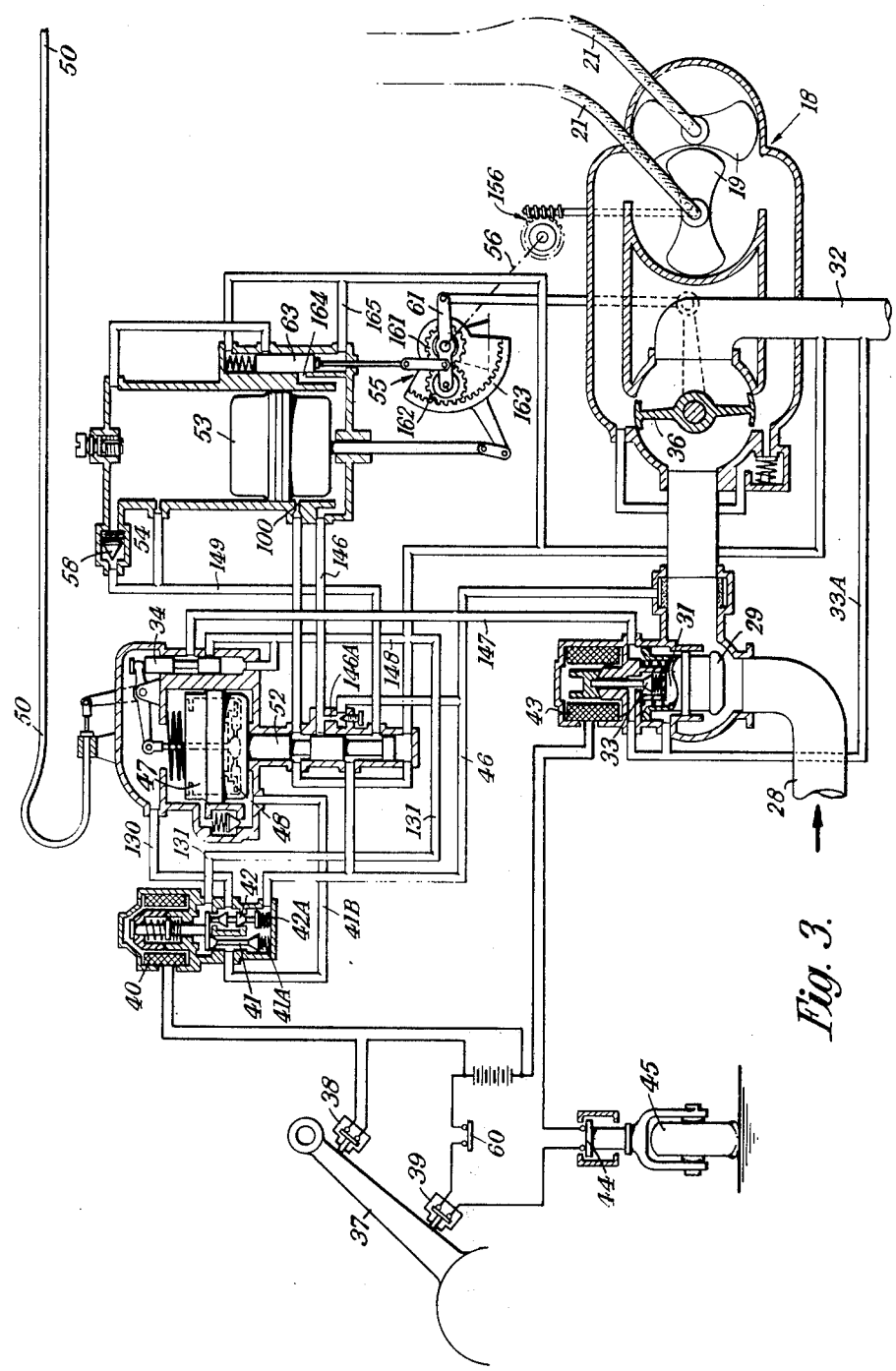
Figure 4:
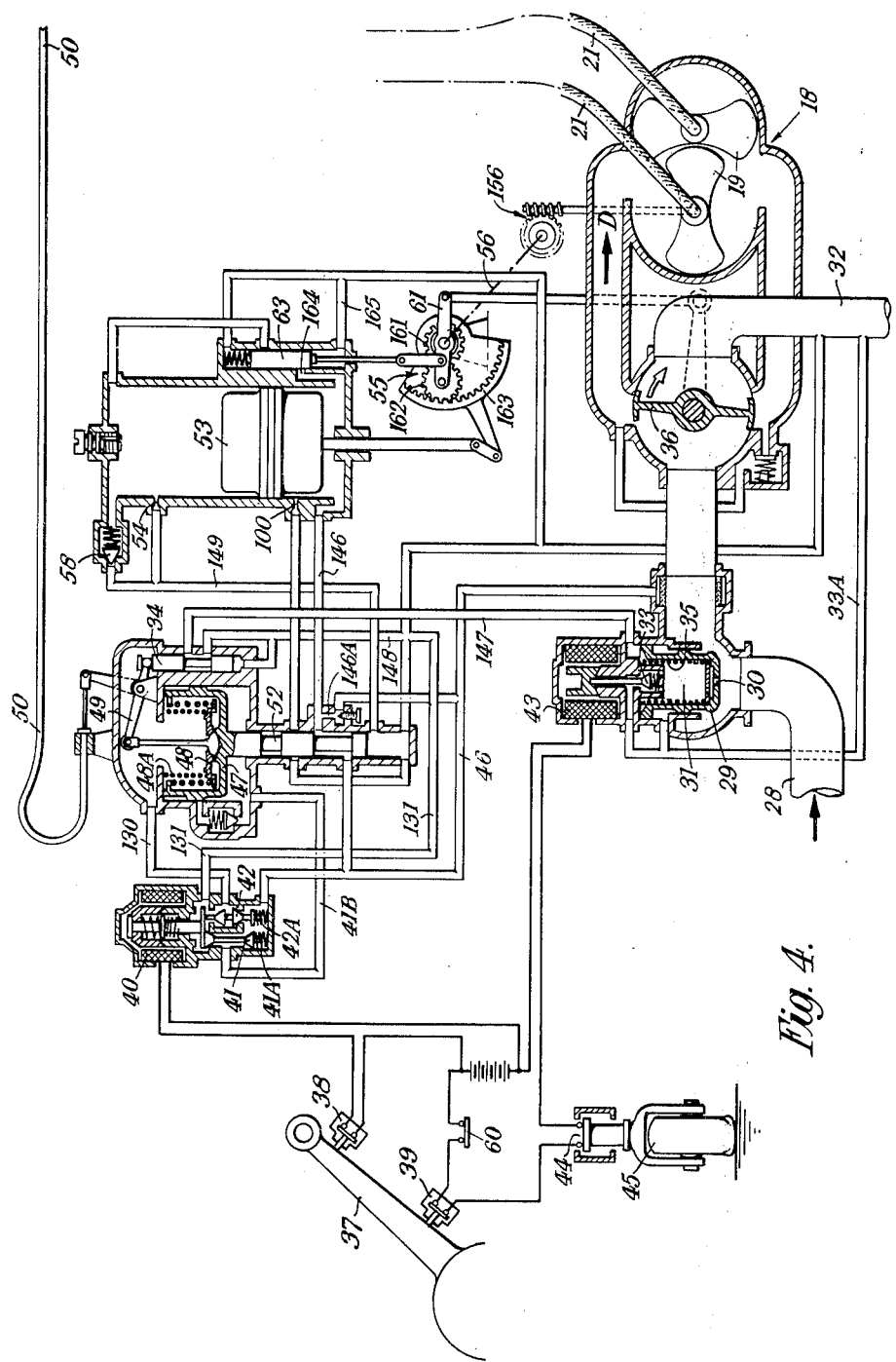
Figure 5:
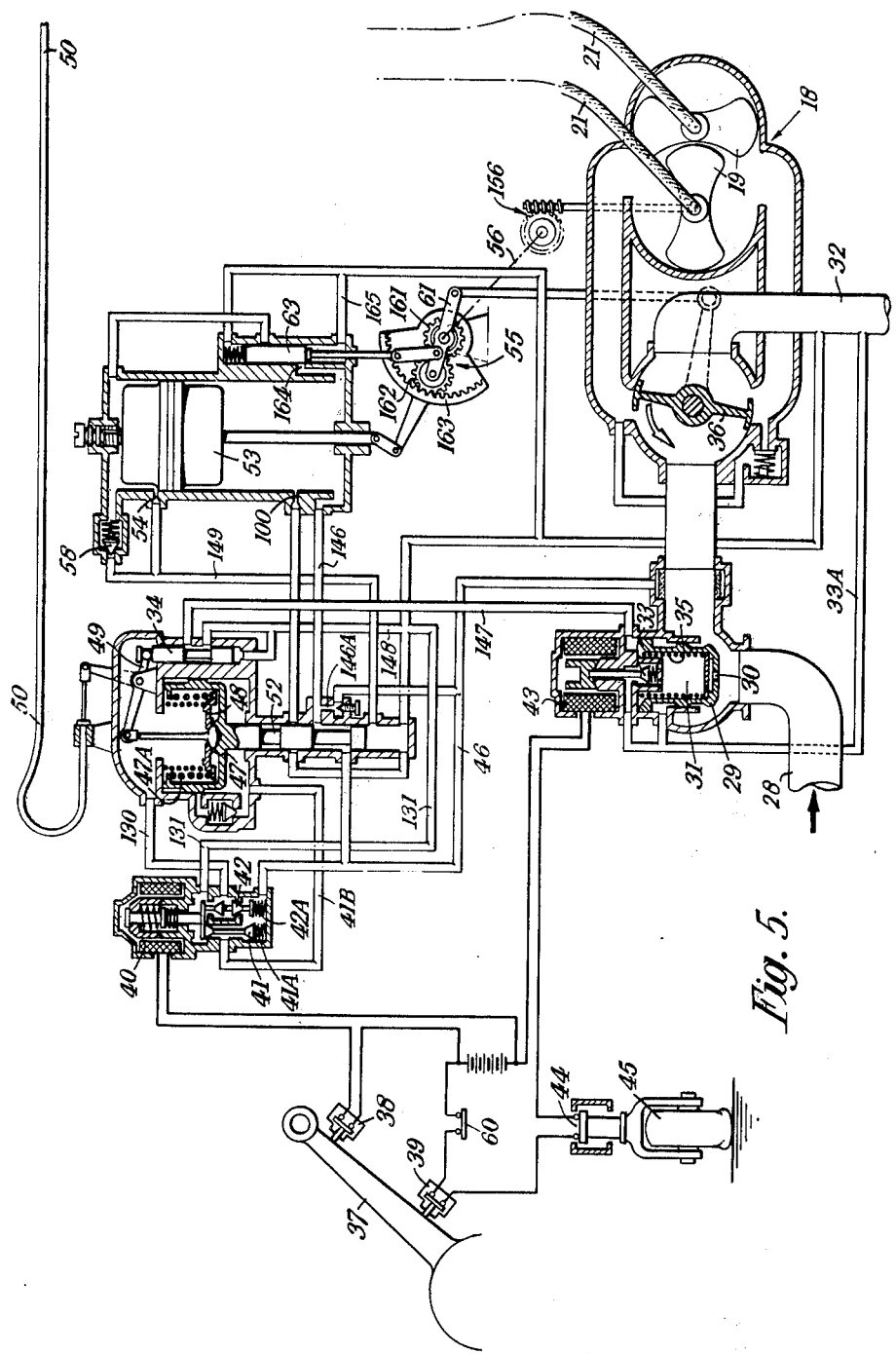
Figure 6:
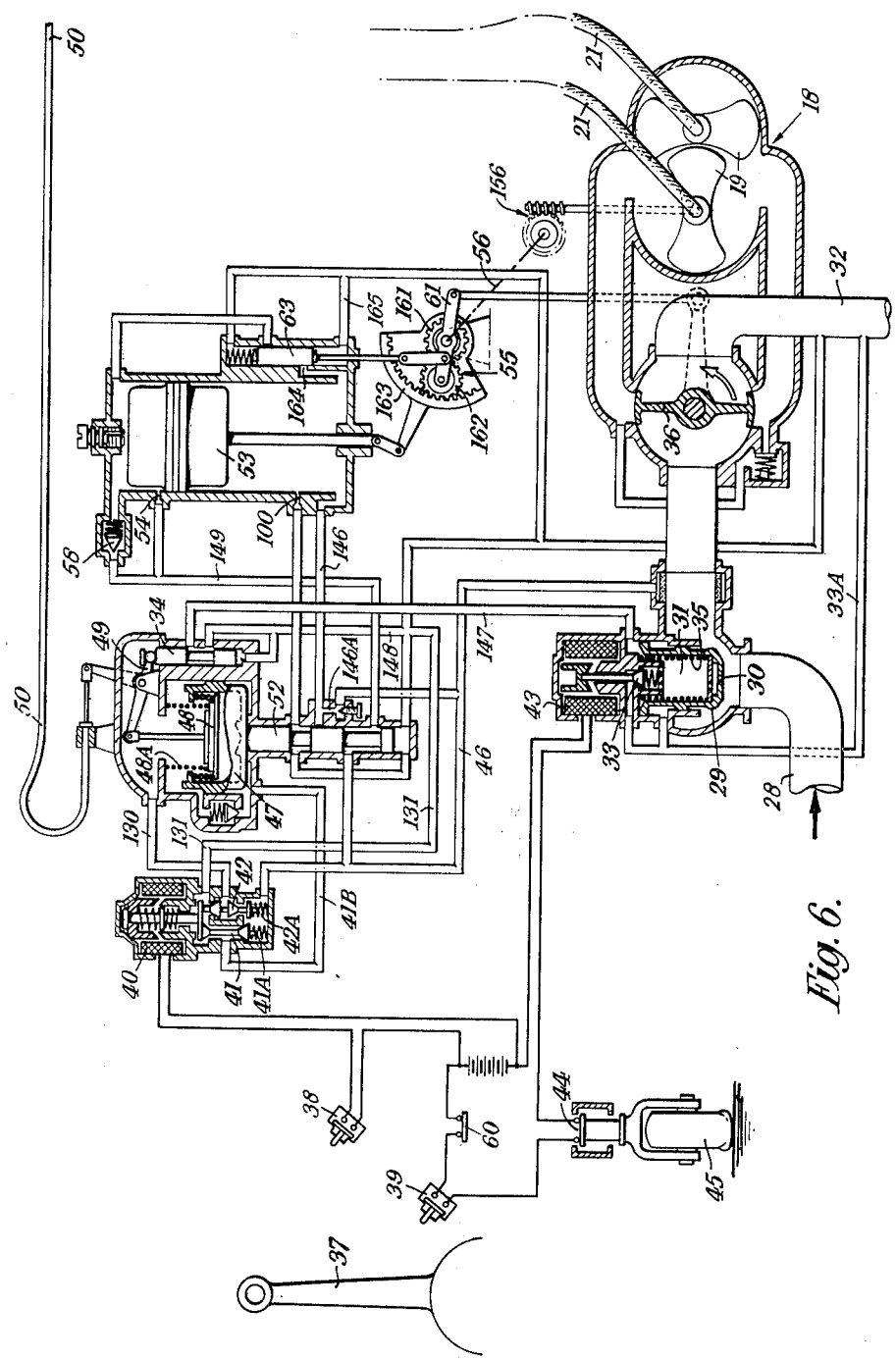
Figure 7:
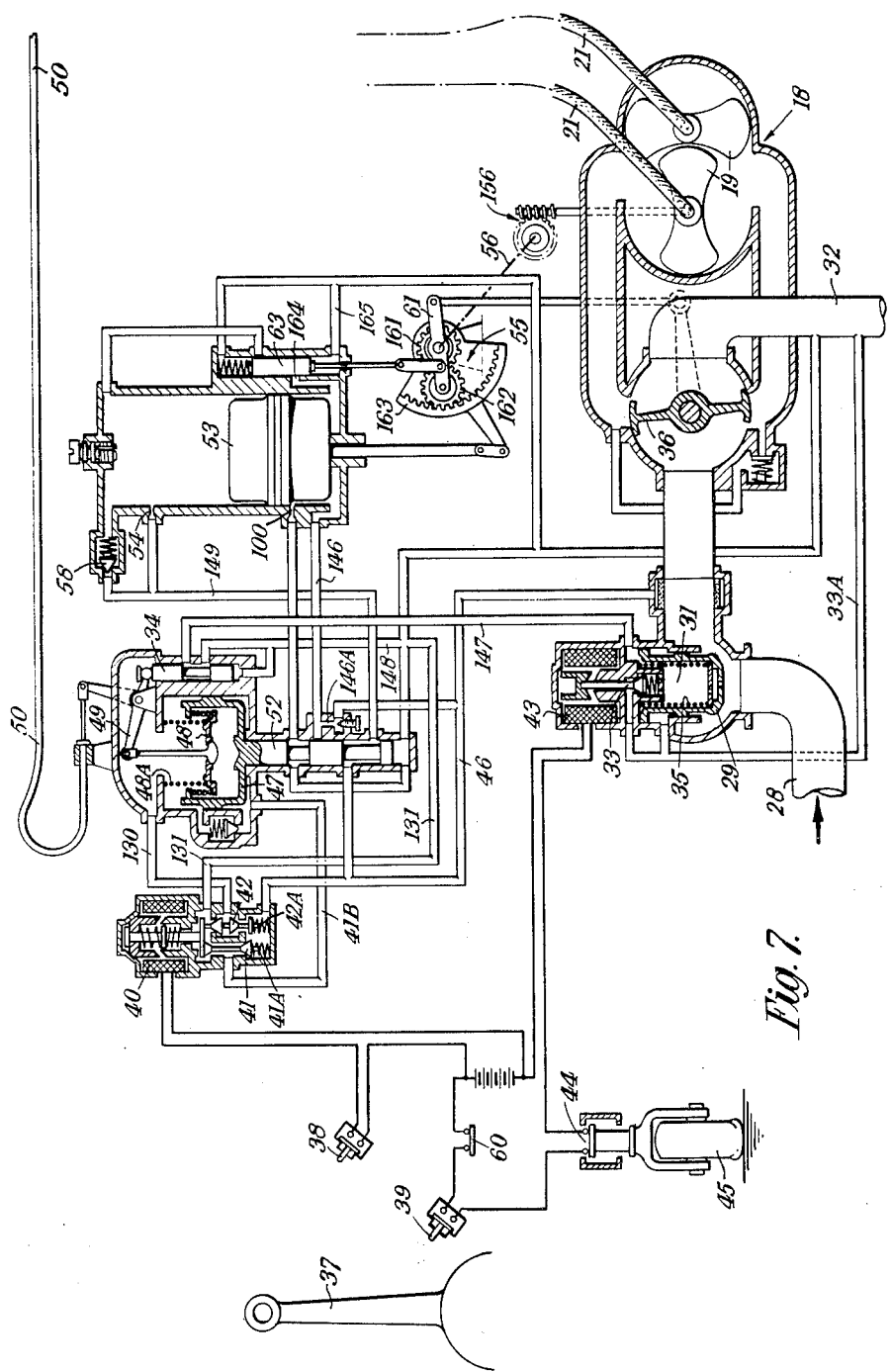
Figure 8:
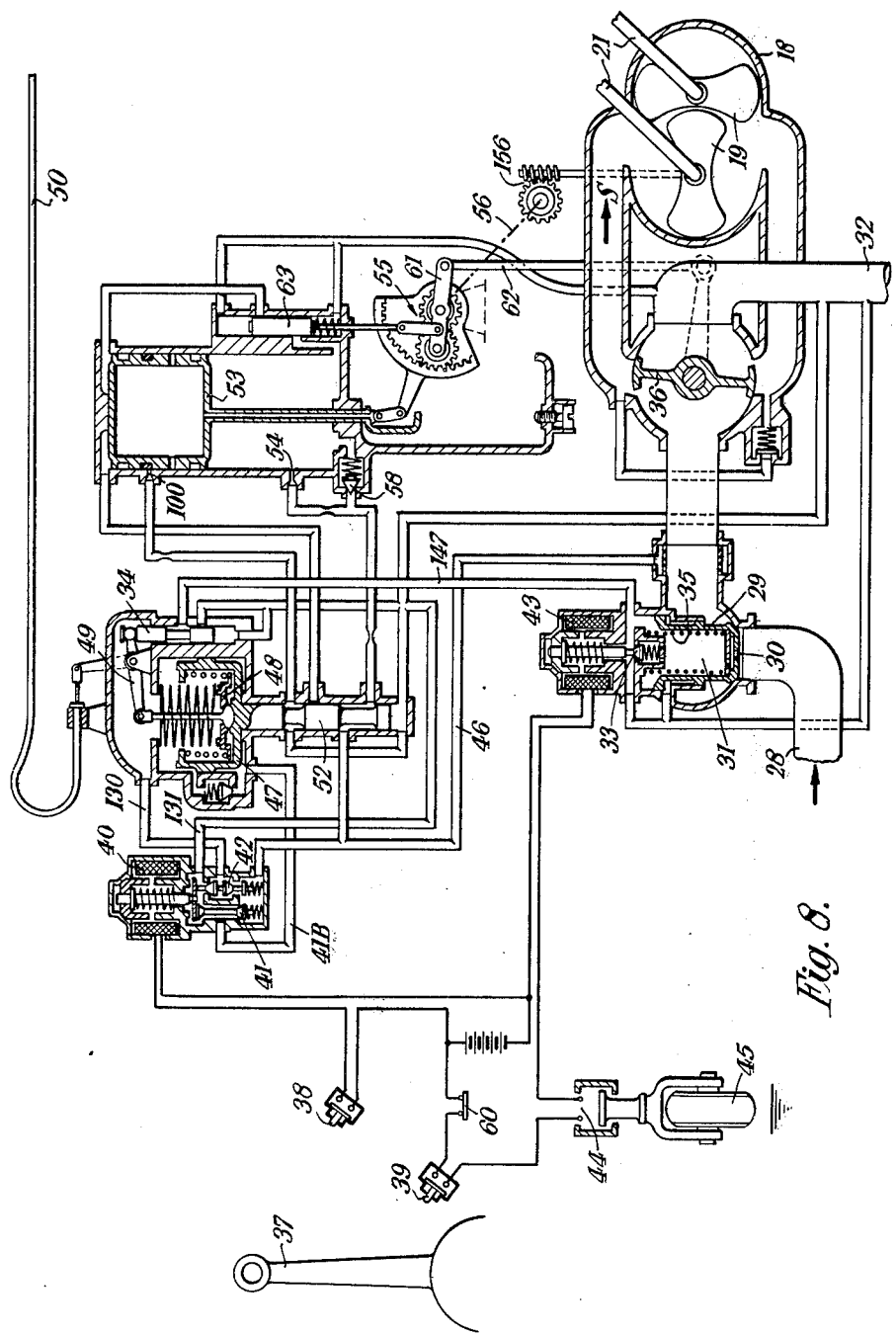

Two alternative forms of thrust reversal system according to the invention will now be described in detail, by way of example, with reference to the accompanying drawings in which:

FIGS. 1 and 1A together show the first embodiment with the buckets stowed,

FIGS. 2 to 7 shown the mechanism illustrated in FIG. 1 at successive stages in deploying and stowing the buckets, FIG. 4A shows the position occupied by the buckets when the remainder of the mechanism is in the position shown in FIG. 4 or FIG. 7, FIG. 6A shows the position occupied by the buckets when the remainder of the mechanism is in the position shown in FIG. 6, and FIG. 8 is a view corresponding to FIG. 1 showing the second embodiment.

Like reference numerals designate like parts throughout the Figures.

The system shown in FIGS. 1 to 7 will first be described. It includes two thrust reversal buckets 10, supported on links 11, 12 which are respectively rotatable about pivots 13 and 14. The buckets 10 are movable between a stowed position shown in FIG. 1A, in which they are locked by a pivoted locking bar 15 having claws 16 engaging pins 17 on the links 11, and a deployed position shown in FIG. 6A.

Movement is imparted to the buckets by an air motor 18, having meshing rotors 19 which drive, through flexible shafts 21 and bevel gearing 22, a shaft 23 which carries a gear 24A, meshing with a gear 24B fixed to a nut 26 which engages a screw threaded shaft 25 and is restrained against axial movement. The shaft 25 is connected at one end by links 27 to the links 11. Rotation of the motor 18 therefore imparts axial movement to the shaft 25 to move the buckets 10.

Air under pressure is supplied from the compressor (not shown) of the aircraft engine to an inlet 28 but this air is normally prevented from flowing to the motor 18 by a shut off valve, constituted by a cup shaped piston 29 subject to the pressure at the inlet 28 and containing a bleed hole 30. Normally the air under pressure in the interior 31 of the piston 29 is prevented from flowing to an exhaust outlet 32 because a valve 33 initially blocks communication between the space 31 and the exhaust outlet. A spring 35 accordingly normally maintains the valve 29 closed. When the valve 29 is opened as later described the direction and speed of rotation of the motor 18 are determined by the position of a flow control valve 36. When the buckets are stowed, as shown in FIG. 1A, the valve 36 occupies a position corresponding to rotation of the motor 18 in the direction to stow the buckets as indicated by the arrow S in FIG. 1. Only after release of the locking bar 15 as described below does the valve 36 move to its alternative position to cause the motor to rotate in the direction to deploy the buckets as indicated by the arrow D in FIG. 4. During normal flight a pilot's lever 37 occupies the position shown in FIG. 1. When the pilot wishes to select thrust reversal he moves the lever 37 to the position shown in FIG. 2, thereby closing switches 38 and 39. Closure of the switch 38 completes a circuit to energize a solenoid 40, thereby shifting a pair of valves 41, 42 against the action of springs 41A, 42A biassing these valves, from the position of FIG. 1 to that of FIG. 2. Closure of the switch 39 prepares a circuit for energizing a solenoid 43, but this circuit is not completed until another switch 44 is closed by ground contact of a wheel 45 of the aircraft as shown in FIG. 3.

When, upon ground contact, the solenoid 43 is energized it opens the valve 33 to exhaust air from the space 31 through a line 33A to the exhaust outlet 32, thereby enabling the pressure of air in the inlet 28 to open the valve 29 against the force applied by the spring 35. Air under pressure is thus admitted from the inlet 28 to the motor 18 but the valve 36 remains, as shown in FIG. 3, in the position corresponding to rotation of the motor 18 in the direction to move the buckets 10 towards the stowed position.

As shown in FIG. 3, opening of the valve 29 permits air under pressure to pass through a line 46, and the valve 41 and a line 41B to the underside of a cup piston 47, so causing this piston and another piston 48 within it to rise against the action of springs 47A, 48A respectively loading them, air from above these pistons being expelled to the exhaust outlet 32 through a line 130, the valve 42 and a line 131. As the piston 48 rises it rocks a lever 49 to cause a cable 50 to rock the latching lever 15 counterclockwise to unlock the buckets 10 as shown in FIG. 4A, rocking of the lever 15 being assisted by the inward pressure applied to the links 11 by the motor 18. Upward movement of the piston 48 also shifts a valve 34 to the position shown in FIG. 4. Upward movement of the piston 47 raises a valve 52 from the position shown in FIG. 3 to that shown in FIG. 4.

When the valve 29 opens, air is admitted from the line 46 through a restricted orifice 146A to the undersides of a piston 53. When the valves 34 and 52 have moved to the positions shown in FIG. 4 a path to exhaust is provided from the space above the piston 53 through a restrictor 54, a line 149 and the valve 52 so that the piston 53 begins to move up. A path to exhaust from the space 31 is also provided through a line 147, the valve 34 and a line 148, so ensuring that the valve 29 will not close should the solenoid 43 be deenergized temporarily owing to closure of the switch 44 should the wheel 45 bounce on the ground.

The piston 53 is connected to the annulus 163 of differential gearing 55. As the piston 53 moves upward at a rate determined by the flow of air to exhaust through the restrictor 54, it operates the differential gearing 55 to shift the flow control valve 36 clockwise to the position shown in FIG. 5 in which it causes the motor 18 to rotate in the direction to deploy the buckets 10. This is effected by a lever 61, joining the centres of the sun wheel 161 and the planet 162 of the gearing 55 and connected by a link 62 to the flow control valve 36. The position of the lever 61 is a measure of the error between the imput to the gearing 55 from the piston 53 and the output represented by feedback 56 through gearing 156 from the motor 18 to the sun wheel 161 of the gearing 55. The piston 53 reaches the end of its stroke shortly before the buckets are fully deployed, whereafter continued rotation of the motor 18 operates through the feedback 56 to close the valve 36 as shown in FIG. 6.

If the above mentioned error should increase above a specified amount then remedial action is required and a valve 63, whose position is a measure of the position of the lever 61, carries out the required action. The error can be caused, for example, by some fault in the transmission between the motor 18 and the buckets causing the motor to turn more slowly than the position of the valve 36 demands. This would mean, referring to FIG. 4, that the piston 53 would continue to move the lever 61 clockwise with no (or less) opposing anti-clockwise input from the motor feedback 56.

The flow control valve 36 would then move to the fully open position before the piston 53 reaches the end of its stroke. Without the valve 63, since the pressure on the top side of the piston 53 reduces by exhaust through the restricted orifice 54, the large pressure drop across the piston 53 would create a force acting through the gearing 55 onto the valve 36 urging it against its stop and could cause mechanical damage somewhere in the linkage.

In the ordinary way the piston 53 moves under the minimum pressure drop across itself to overcome friction, as high pressure in the chamber above the piston bleeds through the restricted orifice 54.

However, the valve 63 moves upwards at a preset error to unmask a port 164 and exhaust through a line 165 the supply pressure underneath the piston 53, and this piston 53 and the valve 36 are then driven by the feedback 56.

The valve 63 operates in similar fashion when the buckets are moved in the direction to stow.

Snubbing, i.e. deceleration, of the travel of the buckets is brought about by coaction of the piston 53 with the orifices in its cylinder towards the end of its stroke. A spring loaded latch 57 serves to latch the lever 15 in the unlocked position as shown in FIG. 4A, this being released by one of the pins 17 as the buckets return to the stowed position.

When the pilot moves the lever 37 to select stowing of the buckets, the switches 38, 39 open. Opening of the switch 39 de-energizes the solenoid 43 and causes the valve 33 to close. A path from the space 31 to exhaust is still afforded by the valve 34 so that the valve 29 does not close.

Opening of the switch 38 de-energizes the solenoid 40 so that the valves 41, 42 resume their original positions. Accordingly, as shown in FIG. 6, air under pressure passes from the line 46 through the valve 42 and a line 130 to the upper side of the pistons 47, 48. The piston 48 is retained in the up position owing to engagement of the latch 57 with the lever 15 but the piston 47 moves down, expelling air to exhaust through a line 41B, the valve 41 and a line 131 and shifting the valve 52 to a position in which it supplies air under pressure from the line 46 through a line 149 and a non-return valve 58 to the upper surface of the piston 53 and permits of passage of air from beneath the piston 53 to exhaust through a restricted orifice 100.

The piston 53 accordingly descends and, through the gearing 55, shifts the valve 36 over to the position shown in FIG. 7 to cause the motor 18 to move the buckets 10 towards the stowed position. As the buckets approach the stowed position they are decelerated by the above-described snubbing action. When the latch 57 is released the piston 48 is freed and descends to return the lever 15 to the locking position and to shift the valve 34 to shut off the exhaust connection from the space 31 and so allow the valve 29 to close.

When the buckets have reached the stowed position and just prior to closing of the valve 29 the valve 36 has been shifted by the feed back connection 56 to the position of FIG. 2.

In the event of flame out, a switch 60 opens to break both the circuits closed by the lever 37 to cause the buckets to return to the stowed position.

FIG. 8 shows a modification in which the piston 53 is at the top of its cylinder in the stowed position of the buckets and is moved downwardly to deploy the buckets. In this case the motor 18 rotates in the reverse direction to deploy the buckets. As will be seen, upward movement of the valve 52 as described above in response to selection of thrust reversal will admit air under pressure from the line 46 to the top of the piston 53 and will pass air to exhaust from beneath the piston 53.

What we claim as our invention and desire to secure by Letters Patent is:

1. A thrust reversal system for a jet aircraft engine comprising:

thrust reverser buckets movable between a stowed and a deployed position;

an air motor capable of rotation in opposite directions and connected to impart movement to the buckets;

a pilot's control operative to select movement of the buckets to the stowed position and to the deployed position;

a flow control valve controlling the direction of flow of operating air to the motor;

locking mechanism operative, when the buckets are in the stowed position, to lock the buckets positively against movement to the deploy position without impeding movement of the buckets towards the stowed position;

means maintaining the flow control valve, when the buckets are in the stowed position, in a position corresponding to movement of the motor in the direction to stow the buckets;

means responsive to selection of movement of the buckets to the deploy position for admitting operating air to the motor through the flow control valve, releasing the locking mechanism and thereafter moving the flow control valve to its alternative position to enable the motor to move the buckets to the deploy position;

a shut off valve which normally prevents the flow of air from the compressor of the engine through the flow control valve to the air motor;

first valve means;

means responsive to ground contact by wheels of the aircraft following selection of thrust reversal by said pilot's control for operating said first valve means and thereby permitting said shut off valve to open;

a second valve means for maintaining said shut off valve open when ground contact by the wheels is lost; and means for automatically decelerating the motor when the buckets approach both the stowed position and the deployed position.

2. A thrust reversal system as claimed in claim 1, in which the shut off valve is a cup shaped piston subject to air pressure at an inlet to the air motor and containing a bleed hole, and which includes a spring urging the shut off valve to the closed position, said first and second valves being effective, when opened, to vent the interior of the cup shaped piston to exhaust.

3. A thrust reversal system as claimed in claim 1, wherein said first valve is controlled by a solenoid arranged to be energized by closure of a switch associated with the pilot's control and a ground contact switch.

4. A thrust reversal system as claimed in claim 1, which includes a normally closed shut off valve, means operative in response to selection of thrust reversal by the pilot for opening the shut off valve to admit air under pressure through the flow control valve to the air motor, a first piston and cylinder assembly operable in response to opening of the shut off valve to release the locking mechanism and thereafter to admit air under pressure to a second piston and cylinder assembly to cause the latter to shift the flow control valve to its alternative position.

5. A thrust reversal system as claimed in claim 1, which includes a pneumatic piston and cylinder assembly operable under pilot's control to impart movement to the flow control valve, a differential gear having an input connected to said assembly and an output connected to the flow control valve and a feedback mechanism between the air motor and the differential gear.

6. A thrust reversal system as claimed in claim 1, wherein said locking mechanism comprises a pivoted locking bar having a claw at each end thereof and which includes links movable to shift the buckets to their alternative position and pins on said links which engage the claws on the locking bar when the buckets are in the stowed position to impede movement of the links in the direction to deploy the buckets.

7. A thrust reversal system for a jet aircraft engine comprising:

thrust reverser buckets movable between a stowed and a deploy position;

an air motor capable of rotation in opposite directions and connected to impart movement to the buckets;

a pilot's control operative to select movement of the buckets to the stowed position and to the deployed position;

a flow control valve controlling the direction of flow of operating air to the motor;

locking mechanism operative, when the buckets are in the stowed position, to lock the buckets positively against movement to the deploy position without impeding movement of the buckets towards the stowed position;

means maintaining the flow control valve, when the buckets are in the stowed position, in a position corresponding to movement of the motor in the direction to stow the buckets;

means responsive to selection of movement of the buckets to the deploy position for admitting operating air to the motor through the flow control valve, releasing the locking mechanism and thereafter moving the flow control valve to its alternative position to enable the motor to move the buckets to the deployed position;

a pneumatic piston and cylinder assembly operable under pilot's control to impart movement to the flow control valve, a differential gear having an input connected to said assembly and an output connected to the flow control valve;

a feedback mechanism between the air motor and the differential gear;

valve means operable in response to a predetermined discrepancy between the input and the output of the differential gear to exhaust the pressure acting on the piston of said assembly; and means for automatically decelerating the motor when the buckets approach both the stowed position and the deployed position.

* * * * *